(12) United States Patent
Cambois

(10) Patent No.: US 8,456,949 B2
(45) Date of Patent: Jun. 4, 2013

(54) METHOD FOR DETERMINING SIGNAL QUALITY IN DUAL SENSOR SEISMIC STREAMER SIGNALS

(75) Inventor: Guillaume Cambois, Oslo (NO)

(73) Assignee: PGS Geophysical AS, Lysaker (NO)

( * ) Notice: Subject to any disclaimer, the term of this patent is extended or adjusted under 35 U.S.C. 154(b) by 898 days.

(21) Appl. No.: 12/315,461

(22) Filed: Dec. 3, 2008

(65) Prior Publication Data

US 2010/0135113 A1   Jun. 3, 2010

(51) Int. Cl.
*G01V 1/38* (2006.01)
*G01V 1/30* (2006.01)

(52) U.S. Cl.
USPC .................. 367/21; 367/20; 367/24; 367/154

(58) Field of Classification Search
USPC ....... 367/13, 21, 24, 43, 46; 375/297; 702/14, 702/17
See application file for complete search history.

(56) References Cited

U.S. PATENT DOCUMENTS

| 5,051,963 A * | 9/1991 | Linville, Jr. et al. ............ 367/46 |
| 5,517,463 A * | 5/1996 | Hornbostel et al. ............ 367/13 |
| 5,757,720 A | 5/1998 | Soubaras |
| 5,774,417 A * | 6/1998 | Corrigan et al. ................ 367/24 |
| 7,239,577 B2 | 7/2007 | Tenghamn et al. |
| 7,359,283 B2 | 4/2008 | Vaage et al. |
| 2004/0247042 A1 * | 12/2004 | Sahlman ....................... 375/297 |
| 2005/0114034 A1 * | 5/2005 | Bagaini ........................... 702/14 |
| 2005/0195686 A1 * | 9/2005 | Vaage et al. .................... 367/21 |

OTHER PUBLICATIONS

Robert Soubaras, "Ocean bottom hydrophone and geophone processing", 1996, SEG Expanded Abstract, pp. 24-27, vol. 15.
European Search Report, Date of Mailing Dec. 27, 2011.
Vaughn Ball, et al, "Dual-sensor summation of noisy data", Expanded Abstracts with Biographies, p. 28-31, Jan. 1, 1996.
Rune Tenghamn, et al., "A Dual-Sensor, Towed Marine Streamer; Its Viable Implementation and Initial Results", Expanded Abstracts, SEG SA Annual Mtg, p. 989-993, Jan. 1, 2007.

* cited by examiner

*Primary Examiner* — Isam Alsomiri
*Assistant Examiner* — Daniel L Murphy

(57) ABSTRACT

A method for determining quality of signals acquired using marine seismic streamers having pressure responsive sensors and motion responsive sensors includes cross ghosting pressure responsive seismic signals and contemporaneously acquired motion responsive seismic signals. First filters are determined that cause the cross ghosted pressure responsive signals to substantially match the cross ghosted motion responsive signals. Second filters are determined that cause the cross ghosted motion responsive signals to substantially match the cross ghosted pressure responsive signals. The first and second filters are convolved and the convolution is used to determine signal quality.

6 Claims, 2 Drawing Sheets

METHOD FOR DETERMINING SIGNAL QUALITY IN DUAL SENSOR SEISMIC STREAMER SIGNALS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of marine seismic data acquisition and processing. More particularly, the invention relates to methods for processing marine seismic signals to attenuate the effects of certain types of noise.

2. Background Art

Seismic surveying is known in the art for determining structures of rock formations below the earth's surface. Seismic surveying generally includes deploying an array of seismic sensors at the surface of the earth in a selected pattern, and selectively actuating a seismic energy source positioned near the seismic sensors. The energy source may be an explosive, a vibrator, or in the case of seismic surveying performed in a body of water such as the ocean, one or more air guns or water guns.

Seismic energy which emanates from the source travels through the earth formations until it reaches an acoustic impedance boundary in the formations. Acoustic impedance boundaries typically occur where the composition and/or mechanical properties of the earth formation change. Such boundaries are typically referred to as "bed boundaries." At a bed boundary, some of the seismic energy is reflected back toward the earth's surface. The reflected energy may be detected by one or more of the seismic sensors deployed on the surface. Seismic signal processing known in the art has as one of a number of objectives the determination of the depths and geographic locations of bed boundaries below the earth's surface. The depth and location of the bed boundaries is inferred from the travel time of the seismic energy to the bed boundaries and back to the sensors at the surface.

Seismic surveying is performed in the ocean and other bodies of water ("marine seismic surveying") to determine the structure and composition of rock formations below the sea bed. Marine seismic surveying systems known in the art include a vessel which tows one or more seismic energy sources, and the same or a different vessel which tows one or more "streamers." Streamers are arrays of seismic sensors in a cable that is towed by the vessel. Typically, a seismic vessel will tow a plurality of such streamers arranged to be separated by a selected lateral distance from each other, in a pattern selected to enable relatively complete determination of geologic structures in three dimensions. It is also known in the art to place cables having seismic sensors ("ocean bottom cables") along the sea bed, and actuate a seismic energy source in the water. Typically, the seismic energy source will be towed by a vessel just as in streamer-type surveying.

Streamers typically include a plurality of pressure responsive sensors such as hydrophones disposed at spaced apart locations along each streamer. Streamers have been developed more recently that include both pressure responsive sensors and particle motion responsive sensors such as geophones. By using both pressure responsive and motion responsive sensors, it may be possible to obtain seismic information within a frequency range that is not well illuminated when pressure responsive sensors are used alone. Such frequency range results from reflection of the seismic energy from the water surface, and is referred to as the "ghost notch" in the seismic frequency response. An example of a seismic streamer using both pressure responsive sensors and motion responsive sensors is disclosed in U.S. Pat. No. 7,239,577 issued to Tenghamn et al. and assigned to the assignee of the present invention.

It has been determined by testing and use of streamers having both pressure responsive and motion responsive sensors that the signals detected by the motion responsive sensors are particularly noisy at low frequencies (approximately 0 to 20 Hz). Such noise is believed to be related to movement of the streamers in the water. The foregoing noise issue has been addressed by methods such as one disclosed in U.S. Pat. No. 7,359,283 issued to Vaage et al. and assigned to the assignee of the present invention. The upper limit of the noise frequency range depends on many factors. One of them is vessel speed: the faster the vessel, the higher the noise level, and therefore the higher the upper limit.

The first notch frequency $f_n$ of the hydrophone ghost is related to the depth d of the sensor by the formula:

$$f_n = V/2d$$

Where V is the velocity of sound in water. For the dual-sensor summation to work properly, the geophone data must have signal to fill the hydrophone frequency notches. Thus, the upper limit of the geophone noise frequency range must be smaller than $f_n$. Therefore, there is a trade-off between the depth in the water at which the streamers may be towed and the speed at which towing may take place. Increased towing speed generates more motion-induced noise, which increases the upper limit of the noise frequency range and consequently reduces the depth at which the streamers can be towed.

What is needed is a method for automatically determining the lowest recoverable frequency from the measured seismic signals that can be performed on a seismic vessel as a real time data quality control measurement so as to ensure optimized towing depth and vessel speed.

SUMMARY OF THE INVENTION

One aspect of the invention is a method for determining quality of signals acquired using marine seismic streamers having pressure responsive sensors and motion responsive sensors. A method according to this aspect of the invention includes cross ghosting pressure responsive seismic signals and contemporaneously acquired motion responsive seismic signals. First filters are determined that cause the cross ghosted pressure responsive signals to substantially match the cross ghosted motion responsive signals. Second filters are determined that cause the cross ghosted motion responsive signals to substantially match the cross ghosted pressure responsive signals. The first and second filters are convolved and the convolution is used to determine signal quality.

A method for seismic surveying according to another aspect of the invention includes towing at least one seismic streamer at a selected depth in a body of water. The streamer includes pressure responsive sensors and motion responsive sensors. A seismic energy source is actuated in the water at selected times. Signals detected by the pressure responsive sensors and the motion responsive sensors are recorded. The pressure responsive seismic signals and the motion responsive seismic signals are cross ghosted. First filters are determined that cause the cross ghosted pressure responsive signals to substantially match the cross ghosted motion responsive signals. Second filters are determined that cause the cross ghosted motion responsive signals to substantially match the cross ghosted pressure responsive signals. The first and second filters are convolved, and the convolution is used to determine signal quality.

Other aspects and advantages of the invention will be apparent from the following description and the appended claims.

DETAILED DESCRIPTION

Figure 1:
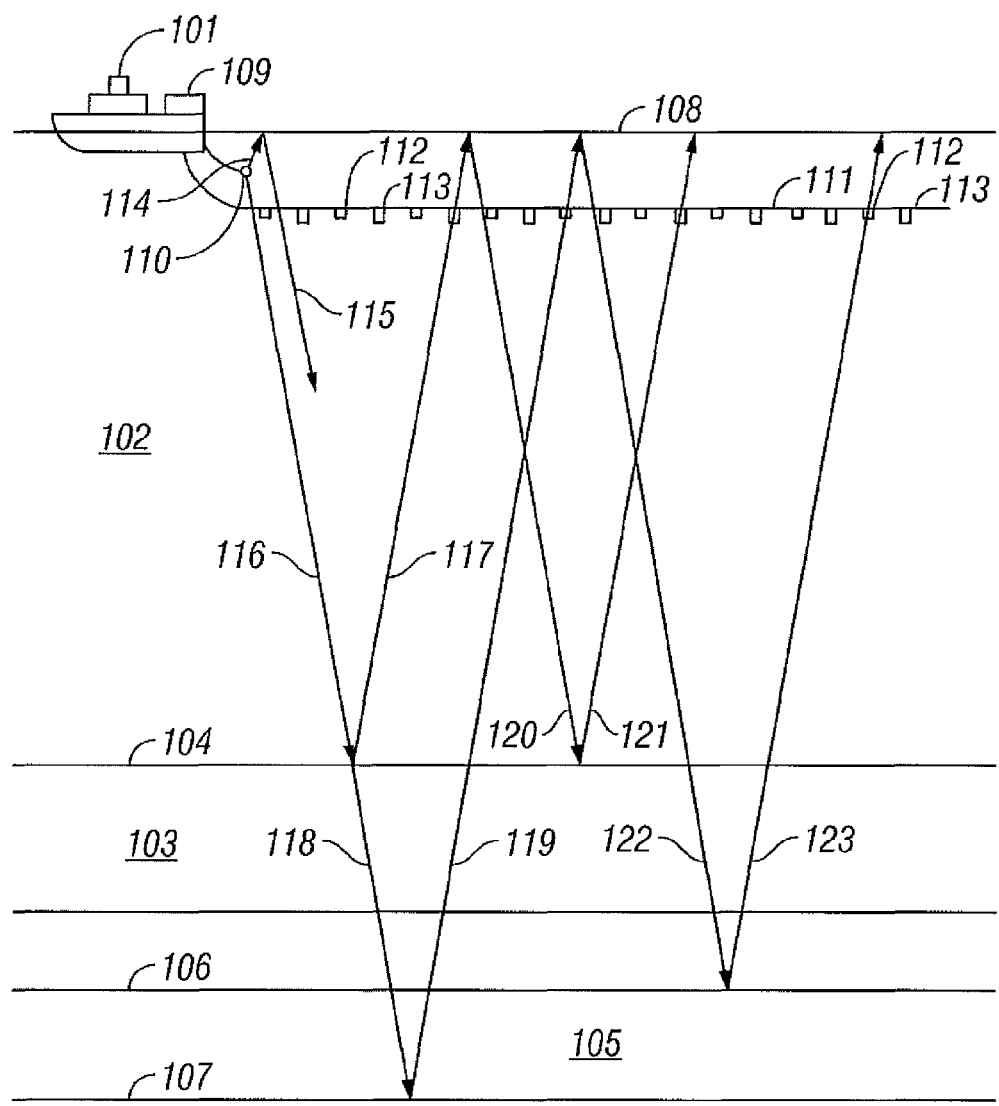
FIG. 1 shows an example of acquiring seismic data for use with a method according to the invention.

FIG. 1 shows an example of acquiring marine seismic data that can be used with a method of the invention. A seismic vessel 101 moves along the surface 108 of a body of water 102 above an area 103 of the subsurface that is to be surveyed. Beneath the water bottom 104, the area 103 of the subsurface contains rock formations of interest such as a layer 105 positioned between an upper boundary 106 and lower boundary 107 thereof. The seismic vessel 101 contains seismic acquisition control equipment, designated generally at 109. The seismic acquisition control equipment 109 includes navigation control, seismic energy source control, seismic sensor control, and signal recording equipment, all of which can be of types well known in the art.

The seismic acquisition control equipment 109 causes a seismic source 110 towed in the body of water 102 by the seismic vessel 101 (or by a different vessel) to actuate at selected times. The seismic source 110 may be of any type well known in the art of seismic acquisition, including air guns or water guns, or particularly, arrays of air guns. Seismic streamers 111 are also towed in the body of water 102 by the seismic vessel 101 (or by a different vessel) to detect the acoustic wavefields initiated by the seismic source 110 and reflected from interfaces, particularly in the subsurface. Although only one seismic streamer 111 is shown in FIG. 1 for purposes of illustrating the invention, typically a plurality of laterally spaced apart seismic streamers are towed behind the seismic vessel 101 (or a different vessel). The seismic streamers 111 contain sensors to detect the acoustic wavefields initiated by the seismic source 110. In the present example the seismic streamers 111 contain pressure responsive sensors 112 such as hydrophones, and water particle motion responsive sensors 113 such as geophones. The hydrophones 112 and geophones 113 are typically co-located in pairs or pairs of sensor arrays at selected positions along the seismic streamers 111. However, the type of sensors and their particular locations along the seismic streamers 111 are not intended to be limitations on the scope of the present invention. For purposes of the invention it is only necessary to have particle motion responsive sensors and pressure or pressure time gradient responsive sensors. Examples of the former may include, for example, velocity meters and accelerometers.

Each time the seismic source 110 is actuated, an acoustic wavefield travels in approximately spherically expanding wave fronts. The propagation of the wave fronts is illustrated herein by ray paths which are perpendicular to the wave fronts. An upwardly traveling wavefield, designated by ray path 114, will reflect from the water-air interface at the water surface 108 and then travel downwardly, as along ray path 115, where the wavefield may be detected by the hydrophones 112 and geophones 113 in the seismic streamers 111. Such a reflection from the water surface 108, as along ray path 115 contains no useful information about the subsurface formations of interest. However, such surface reflections, also known as ghosts, act as secondary seismic sources with a time delay from initiation of the seismic source 110.

The downwardly traveling wavefield, as along ray path 116, will reflect from the earth-water interface at the water bottom 104 and then travel upwardly, as along ray path 117, where the wavefield may be detected by the hydrophones 112 and geophones 113. Such a reflection at the water bottom 104, as in ray path 117, contains information about the water bottom 104. Ray path 117 is an example of a "primary" reflection, that is, a reflection originating from a boundary in the subsurface. The downwardly traveling wavefield, as along ray path 116, may transmit through the water bottom 104 as along ray path 118, reflect from a layer boundary, such as 107, of a layer, such as 105, and then travel upwardly, as along ray path 119. The upwardly traveling wavefield, shown by ray path 119, may then be detected by the hydrophones 112 and geophones 113. Such a reflection from a layer boundary 107 contains useful information about formations of interest, such as layer 105, and is also an example of a primary reflection.

The acoustic wavefields will continue to reflect from interfaces such as the water bottom 104, water surface 108, and layer boundaries 106, 107 in combinations. For example, the upwardly traveling wavefield as along ray path 117 will reflect from the water surface 108, continue traveling downwardly in ray path 120, may reflect off the water bottom 104, and continue traveling upwardly again in ray path 121, where the wavefield may be detected by the hydrophones 112 and geophones 113. Ray path 121 is an example of a multiple reflection, also called simply a "multiple", having multiple reflections from interfaces. Similarly, the upwardly traveling wavefield in ray path 119 will reflect off the water surface 108, continue traveling downwardly in ray path 122, may reflect off a layer boundary 106 and continue traveling upwardly again in ray path 123, where the wavefield may be detected by the hydrophones 112 and geophones 113. Ray path 123 is another example of a multiple reflection, also having multiple reflections in the subsurface below the water bottom.

For purposes of the following explanation and as may be inferred by the explanation above concerning the types of sensors that may be used in the streamers 111, the terms "hydrophone" and "geophone" are used as shorthand descriptions for the types of signals being processed. It is to be clearly understood that the term "hydrophone" in the following description is intended to mean a signal detected by any form of pressure responsive or pressure time gradient responsive sensor. Correspondingly, "geophone" signals are interned to mean a signal detected by any form of particle motion responsive sensor, including accelerometers, velocity meters and the like.

Figure 2:
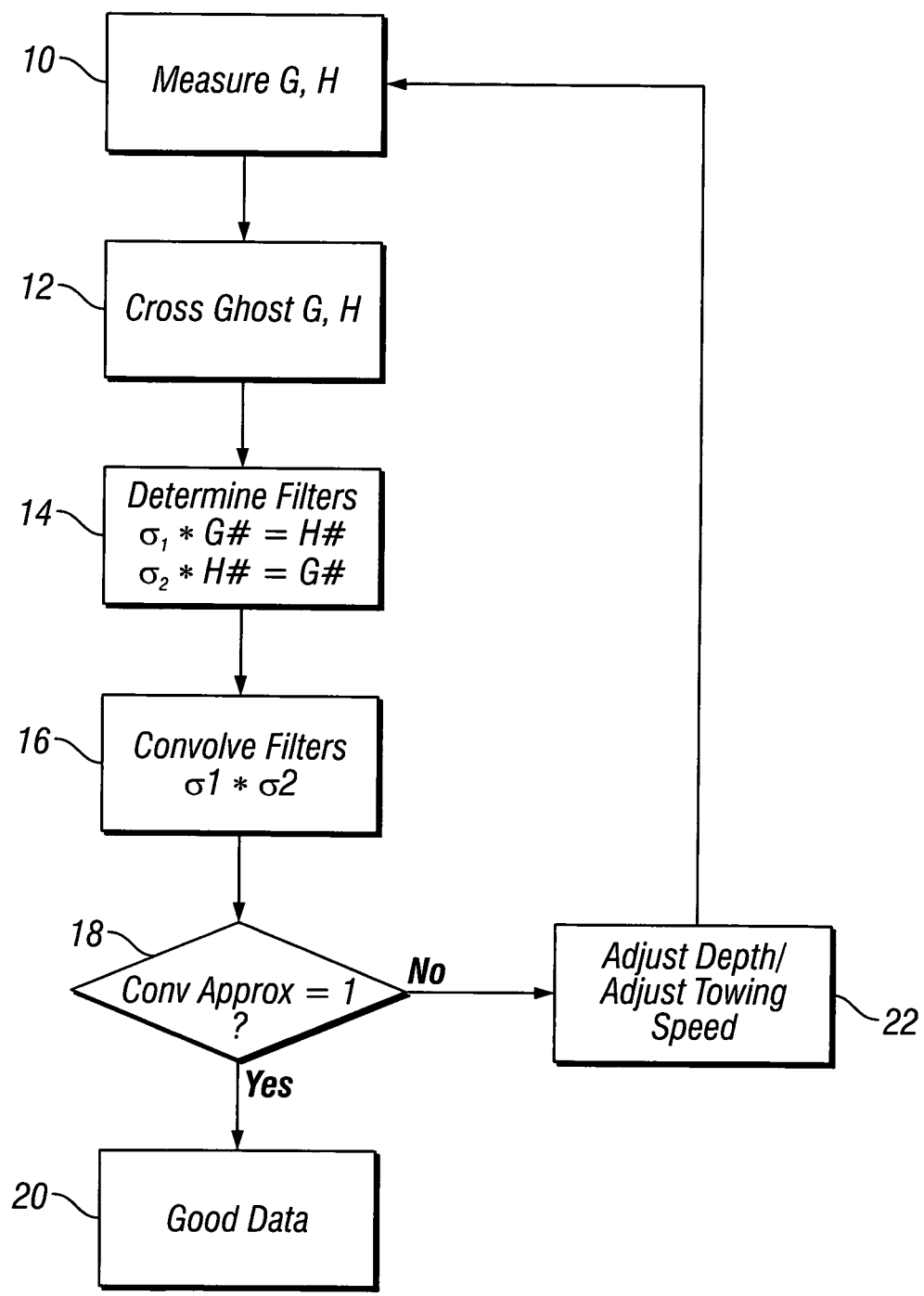
FIG. 2 shows a flow chart of an example method according to the invention.

A method according to the invention can begin by using recorded hydrophone and geophone signals corresponding to each actuation of the seismic energy source. Referring to FIG. 2, the recordings can be compensated for their respective sensor and recording channels' impulse responses and the transduction constant of each type of sensor used. Each such record of hydrophone and geophone recordings, at 10 in FIG. 2, corresponding to a particular actuation of the source may be referred to as a "common shot record" or "common shot gather." The signal recordings may be indexed with respect to time of actuation of the seismic source, and may be identified by the geodetic position of each seismic sensor at the time of initiation of signal recording. The geophone signals may be normalized with respect to the angle of incidence of the seismic wavefront detected by each geophone. See, for example, U.S. Pat. No. 7,359,283 issued to Vaage et al. and assigned to an affiliate of the assignee of the present invention for a description of such normalization. The hydrophone response is substantially omni-directional and does not require correction or normalization for angle of incidence.

In a practical implementation of a method, the normalized, recorded seismic signals may then be transformed from the time-position domain into the frequency-wavenumber (f-k) domain. The resulting domain-transformed signals can be expressed as:

$$H = P_{up}(1-Z)h$$

$$G = P_{up}(1+Z)g$$

in which H represents the f-k transform of the hydrophone signals, G represents the f-k transform of the normalized geophone signals, and h and g represent the impulse responses of the geophone and hydrophone respectively. $P_{up}$ represents the upwardly propagating pressure wave field. Z represents the frequency-domain time delay operator or exp $(-i\omega\tau)$ in which i is the imaginary number $\sqrt{-1}$, $\omega$ represents the angular frequency, and $\tau$ represents the "ghost" reflection travel time from the seismic sensors to the water surface and back. The quantities $(1+Z)$ and $(1-Z)$ represent the geophone and hydrophone "ghosting" functions, respectively.

Applying the geophone ghosting function $(1+Z)$ to the hydrophone signals and applying the hydrophone ghosting function $(1-Z)$ to the geophone signals results in the following expressions:

$$H^\# = (1+Z)H = P_{up}(1-Z)(1+Z)h = P_{up}(1-Z^2)h$$

$$G^\# = (1-Z)G = P_{up}(1+Z)(1-Z)g = P_{up}(1-Z^2)g$$

The resulting signals produced by application of the foregoing ghosting functions as shown in the expressions above may be referred to as "cross ghosted" signals, and their calculation is shown at 12 in FIG. 2. The foregoing cross ghosted sensor signals are substantially identical except for the sensor impulse responses (and "direct wave" and noise that may be neglected in the present method). The cross ghosted signals also have an apparent hydrophone ghost with twice the input signal ghost period.

A next step in a method according to the invention, at 14, is to design or determine a short filter, such as a Wiener-Levinson filter, $\sigma_1$ to cause the cross ghosted geophone signals $G^\#$ to substantially match the cross ghosted hydrophone signals $H^\#$ for each set of signals recorded by a collocated pair of sensors (e.g., 112 and 113 in FIG. 1). "Short" as used herein means shorter than double the ghost period in order to avoid inverting the ghost "notch" in the frequency response of the sensors. The length of the filter can be varied for each of the recorded signals, for example, signals recorded by sensors more spaced apart from the source (longer offset) will have shorter ghost periods than smaller offset signals.

In areas of good signal-to-noise ratio $\sigma_1$ should be substantially identical to the transfer function that matches the impulse response of the geophone to the impulse of the hydrophone. In areas of poor signal-to-noise ratio, however, $\sigma_1$ will be mainly related to noise.

Similarly, a short filter such as a Wiener-Levinson filter $\sigma_2$ can be designed to match $H^\#$ to $G^\#$. In areas of good signal-to-noise ratio $\sigma_2$ should be substantially identical to the transfer function that matches the hydrophone impulse response to the impulse response of the geophone. In areas of poor signal-to-noise ratio, however, $\sigma_2$ will be mainly related to noise, just as is the case for $\sigma_1$.

Next, at 16, the foregoing filters may be convolved. When there is good signal-to-noise ratio, the convolution $\sigma_1 * \sigma_2$ will be approximately equal to one, as shown at 18 and then 20 in FIG. 2. The convolution will be substantially less than one in areas where signal to noise ratio is relatively low. The convolution of the two filters therefore provides a quantitative measure of signal quality for the geophone and hydrophone signals. The foregoing quantitative measure can be used to estimate the quality of the geophone signals, which are expected to be noisier than the hydrophone signals primarily as a result of towing noise. By evaluating the filter convolution in the frequency domain, it is possible to analyze which frequencies contain useful seismic signal and which frequencies are substantially compromised by noise. Using the filter convolution it is also possible to automatically evaluate which is the lowest frequency having useful seismic information, and to determine how deep and how fast the streamer can be towed in the water. At 22, if the convolution value is less than one, in one example, a depth of the streamers may be adjusted and/or a towing speed may be adjusted, and the process repeated, beginning at 10.

The method above is based on the assumption that the transfer functions from g to h and from h to g are shorter than the Wiener-Levinson filter length. As example, when towing at a depth of 30 m, the normal incidence ghost period is 40 milliseconds, so the filter operators should be shorter than 80 milliseconds, or twice the ghost period.

It is expected that the impulse responses of the hydrophones and geophones, h and g, are substantially minimum-phase, therefore the transfer functions may also be expected to be minimum-phase and of relatively limited length. However, if the transfer functions are expected to be longer than the double ghost period, one can first apply a global (nominal) transfer function based on a theoretical sensor response, and only compute residual (shorter) filter operators.

The method can be applied on a trace by trace (individual sensor record) basis and on a shot by shot (each actuation of the seismic source) basis. It is therefore possible to measure signal quality for every trace and every shot. However, these unitary traces might be too noisy to be a true reflection of data quality after full processing (and the gains in signal-to-noise ratio associated with stacking). Therefore it is recommended to average the operators over several shots. The number of shots should be a reflection of the data nominal fold to help predict what data quality will be after stack.

The time window chosen for designing the matching filters is also important. First of all it should not include the direct wave to avoid bias. The choice of design window will direct the quality analysis at a particular depth. It is therefore recommended to select a design window around the exploration target.

A method according to the invention may provide estimates of signal quality for seismic signals acquired using so called "dual sensor" seismic streamers.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for determining quality of signals acquired using marine seismic streamers having pressure responsive sensors and motion responsive sensors, comprising:
   cross ghosting pressure responsive seismic signals and contemporaneously acquired motion responsive seismic signals;
   determining first filters that cause the cross ghosted pressure responsive signals to substantially match the cross ghosted motion responsive signals and second filters that cause the cross ghosted motion responsive signals to substantially match the cross ghosted pressure responsive signals;
   convolving the first and second filters;
   using the convolution to determine signal quality; and
   using the convolution to determine a lowest frequency in the motion responsive signals having useful seismic information.

2. The method of claim 1 further comprising adjusting at least one of a depth of a seismic streamer in a body of water and a speed of towing the streamer in the body of water, and repeating the cross ghosting, determining filters and convolving until the convolution is approximately unity.

3. The method of claim 1 wherein the first and second filters comprises Weiner-Levinson filters.

4. A method for seismic surveying, comprising:
   towing at least one seismic streamer at a selected depth in a body of water, the streamer including pressure responsive sensors and motion responsive sensors;
   actuating a seismic energy source in the water at selected times;
   recording signals detected by the pressure responsive sensors and the motion responsive sensors;
   cross ghosting the pressure responsive seismic signals and the motion responsive seismic signals;
   determining first filters that cause the cross ghosted pressure responsive signals to substantially match the cross ghosted motion responsive signals and second filters that cause the cross ghosted motion responsive signals to substantially match the cross ghosted pressure responsive signals;
   convolving the first and second filters; and
   using the convolution to determine signal quality and to determine a lowest frequency in the motion responsive signals having useful seismic information.

5. The method of claim 4 further comprising adjusting at least one of the selected depth and a speed of the towing, and repeating the cross ghosting, determining filters and convolving until the convolution is approximately unity.

6. The method of claim 4 wherein the filters comprise Weiner-Levinson filters.

* * * * *